United States Patent [19]

von Kemenczky

[11] 4,214,501

[45] Jul. 29, 1980

[54] MUSICAL COMPOSER INSTRUMENT AND ELECTRONIC PLAYER (ELECTRONIC COMPOSER)

[76] Inventor: Miklos von Kemenczky, 112 Warrenville Rd., Green Brook, N.J. 08812

[21] Appl. No.: 952,646

[22] Filed: Oct. 19, 1978

[51] Int. Cl.[2] ........................ G10F 5/04; B43L 13/24; G06K 7/06

[52] U.S. Cl. ........................ 84/1.03; 84/1.18; 84/1.28; 33/430; 33/447; 200/46; 235/441

[58] Field of Search ........................ 84/1.03, 1.18, 1.28; 200/46; 33/430, 437, 447; 235/441, 492

[56] References Cited

U.S. PATENT DOCUMENTS

| | | | |
|---|---|---|---|
| 1,092,107 | 3/1914 | Jacobsen | 33/447 |
| 2,377,783 | 6/1945 | Hood | 235/441 |
| 2,541,051 | 2/1951 | Hanert | 84/1.03 |
| 3,015,979 | 1/1962 | Davis | 84/1.18 |
| 3,153,858 | 10/1964 | Noack | 33/430 |
| 3,213,179 | 10/1965 | Clauson | 84/1.18 |
| 3,242,319 | 3/1966 | Lebrun | 200/46 |
| 3,420,940 | 1/1969 | Glass et al. | 84/1.18 |
| 3,491,344 | 1/1970 | Ferber | 235/441 |
| 3,535,973 | 10/1970 | Rosen | 84/1.03 |
| 3,935,431 | 1/1976 | Scheffer | 235/492 |
| 4,044,229 | 8/1977 | Samreus | 235/441 |

FOREIGN PATENT DOCUMENTS

| | | | |
|---|---|---|---|
| 635622 | 12/1927 | France | 33/430 |

OTHER PUBLICATIONS

MPEP 706.03(a).
37 CFR 1.52(c), 1.72(b), 3.13.
35 USC 101, 103, 112.

*Primary Examiner*—Gene Z. Rubinson
*Assistant Examiner*—Forester W. Isen
*Attorney, Agent, or Firm*—Lerner, David, Littenberg & Samuel

[57] ABSTRACT

This invention relates to electric or electronic musical instruments for the production of audible musical composition ranging from quite simple to very complex arrangements. More particularly this invention is a device for the creation and editing of a musical work produced by the composer or arranger and which enables the immediate rehearsal of the fully or partially completed musical arrangement.

The device is designed to be connected to an electronic musical instrument which replays the recorded composition. Such an instrument, for example, can be an electronic organ and/or an electronic musical synthesizer which accordingly either incorporates or is connected to the device.

21 Claims, 16 Drawing Figures

MUSICAL COMPOSER INSTRUMENT AND ELECTRONIC PLAYER (ELECTRONIC COMPOSER)

BACKGROUND OF THE INVENTION

The majority of music enthusiasts and musicians play musical instruments with various success. Most of these players have the talent and ear for the creation of new musical works or for the rearrangement of existing works with new ideas and sound effects. However, many successful musicians are not able to play their own compositions on the piano or organ despite their musical talents. The virtuosity of the play depends upon the time spent for exercise and the coordination ability of the performer. Also, to perform on any musical instrument for an orchestrated reproduction of a complex work is not possible by only only one person. The steps to be taken between the manuscript and the final recording consumes a large amount of time, and typically requires the cooperation of other musicians, and the involvement of technical experts and their accompanying expenses which are not available for most talents.

The first trials of the performance of a musical composition often uncover imperfections in some parts of the composition, especially in the arrangement of the instrumentation. The correction of the manuscript, the intimidation of the changed sections, greatly extends the time of the production.

The recording or the taping of the final work presents similarly expensive and time consuming difficulties. A mistake of one participating musician usually forces the retaping of the corresponding movement or often the entire composition with the participation of the whole orchestra.

Similarly, the player of an individual musical instrument is not able to erase, for example, misplaced notes from the recording. The necessity of a new recording from the beginning to the end is obvious.

This invention represents a device which eliminates the costly and timely way of the audible realization of a musical work as described above.

It is the main object of the invention to provide an audible reproduction of any musical composition, from single melodies to the most complex orchestration, directly from an ordinary strip of paper written by the musician himself. The object of this invention is carried out by a device which reads the strip of paper and controls the play of notes.

U.S. Pat. No. 3,213,179 CLAUSON describes an electro-optical system for pitch or tone character control. Slots and holes punched in a card or slip and representing individual notes of a composition move past a light source; the moving slip is surfaced on a series of photoelectric sensors connected to the corresponding tone generator of an organ. The card or slip is opaque to the light except for the punched holes through which the corresponding photoelement is irradiated for the activation of a tone. A similar electro-optical system is described in U.S. Pat. No. 3,535,973 ROSEN (FIG. 8). The transparent record base 80 containing opaque dots or squares 88 cemented or drawn with a heavy grease marker onto its surface. The record base moves between light source 84 and photosensors 90. The patent suggests the use of "negative photoelements"—not in existence on the market—or electric (electronic) inversers for triggering sounds.

The disadvantages of the known photoelectrical systems result from the large number of tones they must be capable of handling. For example, a medium-sized electronic organ for home entertainment has a manually operable set of 120 keys and 13 pedals. Correspondingly, the slotted slip must have, or be able to accept, 133 rows of punched or marked directions. If the sensing photoelements are correspondingly arranged in one row, the width of a paper slip is 133 times the dimension of one common photoelement (5 mm diameter). Such a strip would be over 66 cm (2 ft.) wide. The inherent weakness of a structure such as a slotted slip, as well as the enormous size of such a transparent record base is obvious.

To reduce the width of the strip and, therefore, reduce the dimensions of the device, it is necessary to rearrange the photoelements into several rows. In this case, the activator light must be individually guided from each row of slots to the corresponding photoelement through transparent light channels. The complexity and difficulty arises from the production, assembly and adjustment of such a system. The developed heat of the necessary intense light source poses a cooling problem, making such a system uneconomical and quite impractical.

Spring wires or brushes for slip contact are not practical for close geometrical arrangements. Such an arrangement shown by the illustrations on FIG. 1 of U.S. Pat. No. 3,015,979 M. DAVIS and on FIG. 6–FIG. 7 of U.S. Pat. No. 3,535,973 ROSEN, collects debris of all kind from the drawn marks or from the immersed metal bits of the individual notes. Such a short circuit condition between the sensors causes a continuous activation or malfunction on one or more of the tone generators which results in destructive sound effects of the composition. Also, the production of such contact pairs with the desired springiness for the continuous tracking of the conductive markes is slow, complicated and extremely expensive. Also to be considered is service and cleaning of the sensors without damaging the device due to the crowded conditions of its possible smallest dimension between adjacent sensors.

SUMMARY OF THE INVENTION

One of the main tasks of this invention is the capability of the composer himself to erase individual or groups of recorded musical notes at any time with ease, and without the destruction of the satisfying parts or notes. The correction of a musical composition with the replacement of the punched holes in a carton, or the replacement of the marks on a film base is impossible for the average musician. The composer concentrates on the musical work with themes, melodies, countermelodies, tempos, and accompanied instrumentation in the mind, and manipulation on the slip or film is disturbing.

A further object of this invention is that the replay of the composition may be stopped at any place along the record at the wish of the listener for the evaluation of individual tones, instruments and special effects without the disappearance of the momentary sound effect.

Common disc record and tape are not capable of producing sound after the driver motor has stopped.

Another object of this invention is to provide a device having variable speed capability during the replay to facilitate the selection of the correct tempo of the beats, measures, etc., without the change of the pitch or the musical scales of the written composition.

It is also an object of the invention to provide control signals for synchronization of existing independent and automatic rhythm systems. Such system imitates sound effects as drums, snare, brush, clave, rimshot, etc., with adjustable tempo and pattern.

A further object of the invention is to provide harmonic or disonant sound effects with graphical means not possible with any known musical instruments or any computerized systems for musical synthesizing.

An additional object of this invention is to provide a simple and fast way for the translation of the common musical notes and symbols of sheet music or manuscript to graphically and erasable drawn lines on a piece of paper, or on any similar elastic material acceptable for marking.

BRIEF DESCRIPTION OF THE DRAWINGS

A convenient and simple realization of the invention is shown in the accompanying drawings.

While the drawings illustrate an embodiment of the invention, it is to be understood that in adapting the same to meet different conditions and requirements, various changes in form, proportion and details of construction may be resorted to without departing from the nature or spirit of the invention.

DETAILED DESCRIPTION OF THE INVENTION

Figure 1:
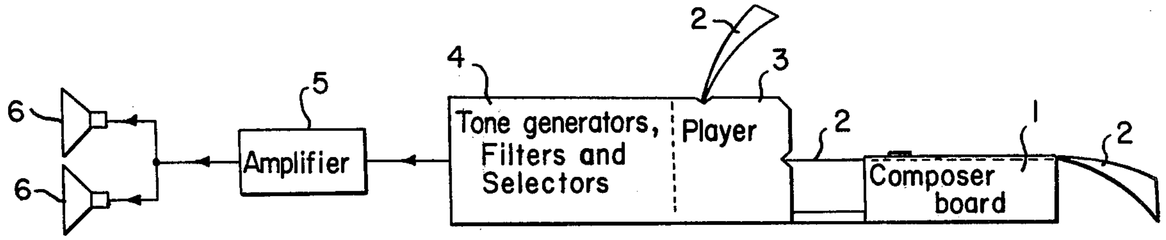
FIG. 1 is a block diagram illustrating the general principles of the operation accordingly as an independent musical unit.

Reference is now made to FIG. 1 which illustrates the combination of the basic components of the system.

The system comprises a composer board 1 with a partially or complete recorded paper slip 2 drawn by the composer. The slip 2 is inserted into the player section 3 of device 4 which is electrically connected to an audio amplifier 5 and to the speakers 6.

The player 3 drives the recorded slip 2 through the device 4. Marks representing notes written or drawn on the slip 2 activate corresponding tone generators, filters, selector switches and the resulting complex audio signals are amplified by amplifier 5. The drawn composition sounds through speakers 6 as the direct result of the composers written work.

Figure 2:
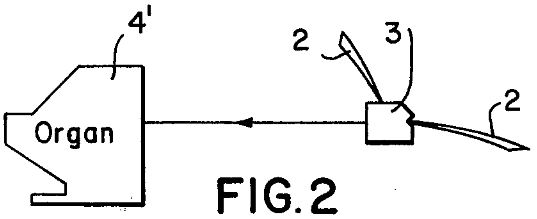
FIG. 2 is a block diagram illustrating the principles of the operation of the unit involving an existing musical instrument.

FIG. 2 illustrates the invention with the same basic components necessary for the operation of the system. However, the device 4' is shown as a conventional electronic musical instrument without the player 3, which instrument is already in existence in numerous variations. Such an electronic musical instrument is, for example, the electronic organ or the musical synthesizer.

Speakers 6, amplifier 5 and the electronic musical instrument 4 are considered to be the already existing property of most musicians, or they are combined in one unit such as the electronic organ 4'.

This invention refers to the device 3 as a player of the recorded slip 2, and, therefore, the device 3 can be connected to the existing music-producing system as an attachment.

The composer board 1 (FIG. 1) serves for the preparation of the slip 2 and can be located at any convenient place away from the electronic musical system, if desired.

Figure 3:
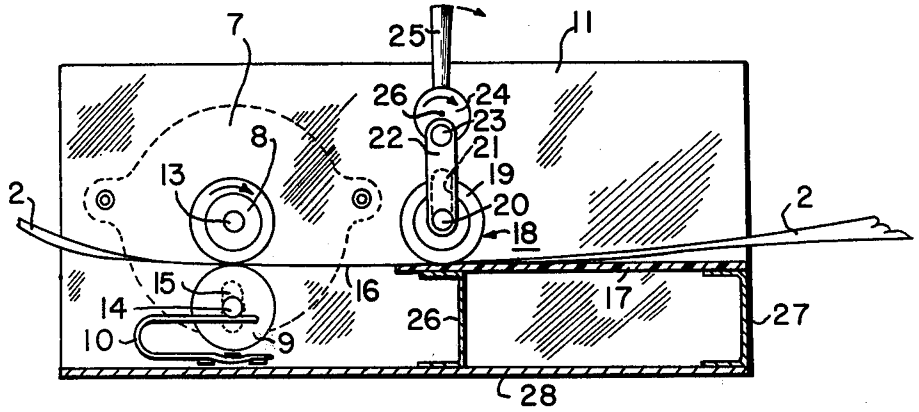
FIG. 3 is a cross-sectional view of the player.

The player device according to this invention, illustrated on FIG. 3, consists of motor 7, a solid friction cylinder 8 and solid pressure cylinder 9. The revolution of the motor 7 is conveniently variable. It is fastened to one of the walls 11–12 of the housing of the device (wall 12 is not shown). The walls 11–12 additionally serve as the mechanical supporting structure for the device and for the guidance of the slip 2.

The friction cylinder 8 is covered with elastomer material such as rubber or a similar synthetic material, and solidly attached to the shaft of the motor 7. The front end of the friction cylinder 8 forms a shaft 13 which secures the position of the friction cylinder 8 between walls 11–12 through a corresponding hole on the wall 12.

Parallel with the friction cylinder 8, the pressure cylinder 9 is placed between walls 11–12. Shafts 14 on both ends of the pressure cylinder 9 are inserted into the corresponding slots 15 of the walls 11–12. A pair of springs 10 fastened to the walls 11–12 press the cylinder 9 into engagement with friction cylinder 8.

As the motor 7 is turned on, the clockwise rotating friction cylinder 8 drives the pressure cylinder 9 counterclockwise (FIG. 3). Paper slip 2, guided to the cylinders 8 and 9, is grasped by the friction cylinder 8 and is thereby advanced at a selected continuous speed from the right to the left.

The prepared slip 2 moves into the sensing section of the device. The sensors pick up the data representing notes on the prepared slip and correspondingly causes the creation the different pitches or tunes including characters by electrical or electronic impulses of the musical instrument. The recorded musical notes are comprised of drawn lines of electrical conductive material such as a graphite mark of a lead pencil, or a conductive ink or paint used for printed circuit board repair. The length of such a conductive mark relates directly to the duration of the selected sound, and its vertical position on the slip 2 corresponds to the selected pitch or tune. The marked side 16 of the elastic slip 2 faces the P.C. board 17 and is pressed against board 17 with the sensor cylinder 18. The sensor cylinder 18 can be of the same type as the friction cylinder 8 and is preferably covered with elastic material 19 similar to the elastomer coating on cylinder 8. Each end of the sensor cylinder 18 has a shaft 20 which is placed into the elongated slots 21 (shown in dotted line) of the walls 11–12. The slots 21 maintains the correct position of the sensor cylinder 18 against the direction of the right-left movement of the slip 2 but permits the free rolling of the cylinder 18.

Additionally, both shafts 20 of the sensor cylinder 18 are inserted into openings in thin metal strips 22, each strip being provided with two holes, one on each end. The upper hole of the strip 22 is placed on the excentrically formed extension 23 of the lifter rod 24. The lifter rod 24 is positioned into the corresponding holes of walls 11–12. Solidly attached to the lifter rod 24 is a handle 25. The distance of the center of rotation 26 of the lifter rod 24 from the P.C. board 17, is designed to press the advancing slip 2 to the P.C. board 17 with a predetermined pressure. This pressure can be released by the rotation of the lifter rod 24. The handle 25 serves as the manipulator for the release of the slip 2. Then the recorded slip 2 can be easily removed from the device.

The P.C. board 17 is fastened to brackets 26–27 which are also fastened to the base 28 of the device. The sensing part of the P.C. board contains the necessary number of slip contact pairs which are electrically bridged by the passing conductive marks of the recorded slip 2.

According to this invention, the sensing capability is incorporated into a simple printed circuit board on which a part or all of the necessary electronic components of an electronic musical instrument are soldered. The elastic character of the slip 2 (tracing paper, for example), and the elastomer coating (19) of the sensor cylinder 18 assures the steady contact between the sensing contact pairs and between the conductive marks on the continuously moving slip 2.

The sensors (FIG. 7) are formed by etching portions of the conductive surface from the the surface of P.C. board 17. Each conductor line 30 is approximately 0.5 mm. wide and positioned parallel to each other with 1.5 mm. distances.

The orientation of the elongated conductor lines 30 correspond to the direction of the advancing slip 2. These conductor lines 30 are separated along the dotted line 31, for example, by etching, which dotted line is perpendicular to the direction of movement of the slip 2. The width of the gap between the separated portions along the dotted line 31 is only some tenths of a millimeter (0.3 mm).

Figure 4:
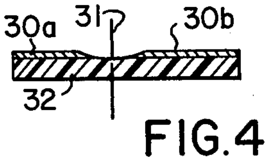
FIG. 4 is an enlarged cross-sectional view of the parted conductor.

FIG. 4 shows a cross-sectional view of the apparatus used for forming the separations in the conductor lines 30 in greatly enlarged depiction. On the insulating board 32, backed and etched conductor line is separated into conductor line sections 30*a* and 30*b*, which form the two poles of a switch in its "OFF" state. This "switch" is in its "ON" state if the sections 30*a* and 30*b* are bridged with any conductive material, such as the conductive marks on the slip 2.

According to this invention, the interfacing edges of the sections 30*a* and 30*b* are ground or machined out from the conductive material down to the insulator board 32. The radius of the ground curvature corresponds to the radius of the sensor cylinder 18. The parted sections 30*a* and 30*b* are plated with hard chrome or similar material for an improved mechanical resistance against the abrasive effect of the advancing slip 2 during normal use of the equipment.

Figure 5:
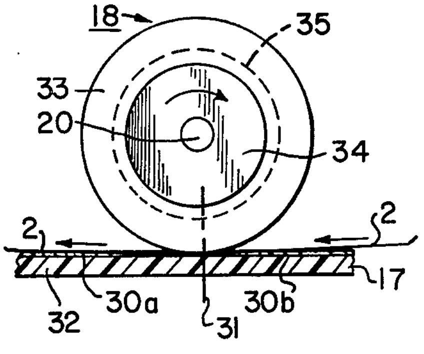
FIG. 5 is an enlarged cross-sectional view of one sensor with the press cylinder.

The recorded slip 2 (FIG. 5) advances along the surfaces of all of the conductive lines 30, and the conductive marks bridging the separated sections 30*a* and 30*b* correspondingly to the length and position of those marks. The sensor cylinder 18 rolls over the unmarked top surface of the elastic slip 2 and pushes it into the ground-out partition sections 30*a* and 30*b*.

Therefore, each shortened section 30*a* and 30*b* connects electrical signals from a common power source or from the bus line to the individual tone generators of the musical instrument and thereby triggers oscillation.

Conductive debris removed from slip 2 is wiped out from the concave partition of sections 30*a* and 30*b*, hence no sharp corners exist. It is obvious that the production of such a sensing board 17 is fast and inexpensive.

It is necessary to mention that the recorded slip 2, or the slip for translating musical notes to conductive lines, can be common writing or better quality tracing paper. This invention does not specify the thickness of the paper or the wide variety of the possible width, shape and arrangement of the sensing conductive lines 30. However, the thickness of a recording paper is related to the width and to the parallel separations of the conductive lines 30 on the P.C. board 17. For example, a close arrangement of the conductor lines 30 calls for a thinner and more elastic recorded slip 2 than is required for use with conductor lines 30 with wider separations.

Generally, the elastic (rubber, etc.) coating on the sensor cylinder 18 under pressure secures the uninterrupted contact between the sensing sections 30*a* and 30*b*. However, the elastic recorded slip 2 is pressed down onto the P.C. board 17 along the total width of the slip 2, not only onto the conductive lines but onto the insulating board 32 in the region of the gap between the separated lines (FIG. 4).

Figure 6:
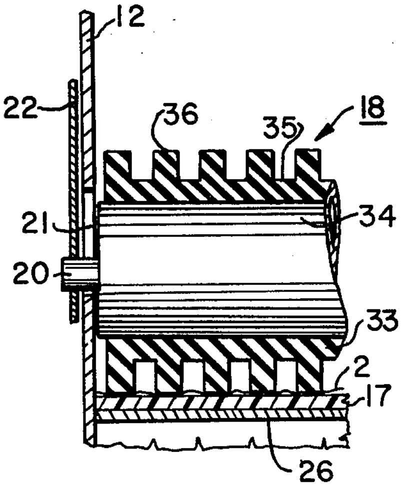
FIG. 6 is a partial cross-sectional enlarged view of the press cylinder.
Figure 7:
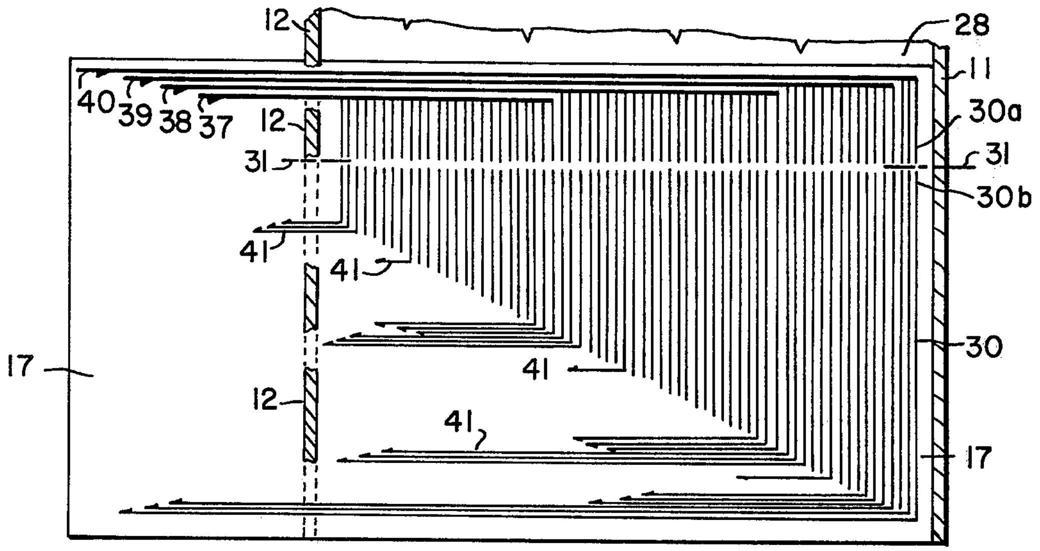
FIG. 7 is a top view of the printed circuit board.

In order to reduce the friction developed due to the pressure between sensor cylinder 18 and P.C. board 17, and in accordance with this invention, the elastic (rubber) coating 33 (FIG. 5 and FIG. 6) molded around the rigid cylindrical core 34 of the sensor cylinder 18 is corrugated concentrically around its axis of rotation. The grooves 35 of the corrugated coating 33 are separated with the same 1.5 mm. spacing as the conductor lines 30 on the P.C. board 17. Consequently, only the ribs 36 of the corrugation press the recorded slip 2 onto the conductor lines 30 (FIG. 7). Between these grooves, the recorded slip 2 "floats" over the surface of the insulator board 32 with diminished friction.

This shape of the elastic coating greatly reduces the size of the driver motor 7 (FIG. 3) and improves the electrical communication between the conductive marks on the surface 16 of slip 2 and between the sensing sections 30*a–b*.

Since the attraction or friction between a paper slip 2 and rubber coating 36 is much greater than it is between paper slip 2 and between a polished hard surface of the conductor lines 30, the driver motor 7 can directly rotate the sensor cylinder 18, and so the difference of the friction between slip 2 and coating 36 and between slip 2 and lines 30 as described above, advances the recorded slip 2. In this case, friction cyliner 8 (FIG. 3), pressure cylinder 9, and springs 10 are eliminated.

FIG. 7 depicts, as an example, an arrangement of the conductor lines 30 of the P.C. board 17. Viewed from the top, these lines 30 are grouped. From the left to the right, the shorter sections 30*a* separated from their associated lines 30*b* are connected to the common power source (or bus line) of two octaves of the Swell manual 37, to two octaves of the middle tones 38 (Grand manual), to one octave of base (pedal) 39, to percussion and noise generators (Rhythm box) 40. The longer lines 30*b* are connected individually to the corresponding tone generators or to its triggers, symbolized with arrows 41 at their ends.

The left side of the P.C. board 17 (FIG. 7) contains all or only parts of the electronic components (not illustrated on the drawing) necessary for the creation of electronic music or for the control of an existing musical electronic instrument.

In accordance with this invention in connection with the description of FIGS. 1 and 2, it is obvious that the practical dimensions of this device compared, for example, to the size of an electronic organ for home entertainment, is very small.

The cost of the production is similarly related to the same ratio.

Depending on the quality of the surface of the recorded paper slip 2, the electrical contact between the conductive marks and the individual sensors is not always perfect. The resulting electric or acoustic noises are often unsatisfactory. These noises could be caused by a hastily-drawn imperfect graphite line on the recorded slip.

For the elimination of the noises or short interruptions in a sound, capacitors and resistors are used as filter components. The function of the filter circuit is already known and is routinely used everywhere in the electronic field.

However, in connection with this invention, the noise suppression is a necessity, and the application of RC elements simplify this task.

Figure 8A:
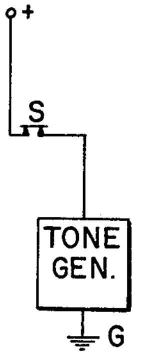
FIGS. 8*a* through 8*e* show diagrams of typical electronic circuits which may be used in conjunction with the present invention.

FIGS. 8*a* through 8*e* show different simple circuits applied to the trigger terminal of the individual tone generators. The selection of the correct or the most economical circuit for noise suppression varies widely between electronic musical systems. For example, in an electronic organ, the depression of the key of the manual makes mechanical contact between the bus bar and individual trigger conductors. But, in the same electric organ with three manuals and one pedal board, for example, the switched "ON" trigger impulses greatly differ from each other. For example, the key on the Swell manual connects a direct current with positive polarity respectively to the electrical ground. The resistance of the input line varies between systems in the order of 10–100 Kohms. Since the resistance of the conductive graphite marks on the paper slip 2 is of the order of some 1 Kohms, the sound triggered by the graphite mark sounds the same as with a key triggered sound. Noise suppression is not necessary if the sound is in the REVERB mode or it is sustained, since those deceiving sound effects are generated with capacitors in the corresponding tank circuits. In this case, the sensor of the device bridged by the conductive mark connects the trigger current directly to the tone generator (FIG. 8*a*).

Figure 8B:
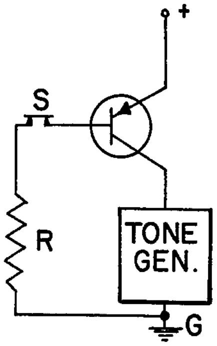

The circuit shown in FIG. 8*b* uses a switching transistor between the positive power source and the tone generator if the resistance of the trigger input is too low compared to the resistance of the conductive mark. The sensor is coupled to the base of the transistor through a current-limiting resistor R.

Figure 8C:
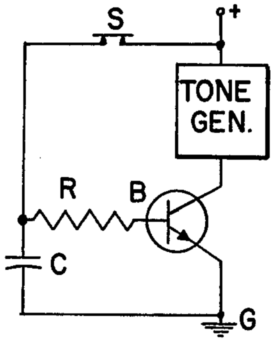

The pedal keyboard (base) of the same organ, mentioned before as an example, also triggers sounds with positive impulses by the depression of the pedals. If the sounds are tabulated on the normal decaying mode (no Reverb or Sustain), then short interruptions of the sound, especially in the case of large durations of the sound (a full measure of a note), results in a disturbing acoustic effect (crackling noises). The use of noise suppression techniques is a necessity. FIG. 8*c* offers a simple circuit for suppression.

The circuit of FIG. 8*c* consists of a switching transistor in series with the tone generator's trigger circuit. The sensor S is connected to the base B of the transistor through current-limiting resistor R. Capacitor C is connected between the S-R terminal connection and between the ground G. The transistor is in its "OFF" state unless the S sensor is shorted. A short caused by the conductive mark on the recorded slip connects capacitor C to the positive power supply and charges it. The short also biases the transistor to its "ON" state which triggers the corresponding tone generator. In the case of short interruptions of the conductivity by the sensor caused by an imperfect graphite line on the slip, the capacitor C supplies current to the base B of the transistor; therefore, the transistor remains in its "ON" state.

The value of the capacitor C, according to this invention, is determined by the ohmic value of resistor R and the acceptable extension of the decay of a sound, respectively. That means that the duration of a triggered sound should not be longer than the shortest (staccato) tones used in the musical composition.

The Grand manual of the example mentioned, however, generates tones differently from the other parts of the organ. The depressed keys connect alternating currents of the corresponding tones shaped with filters according to the selected tabs to the preamplifier of the musical system.

Figure 8D:
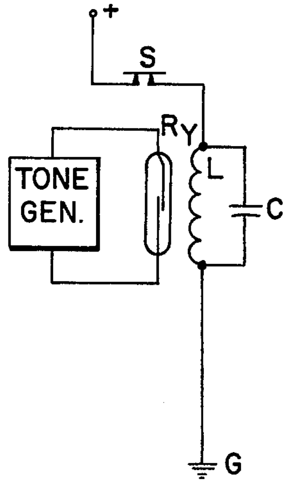
Figure 8E:
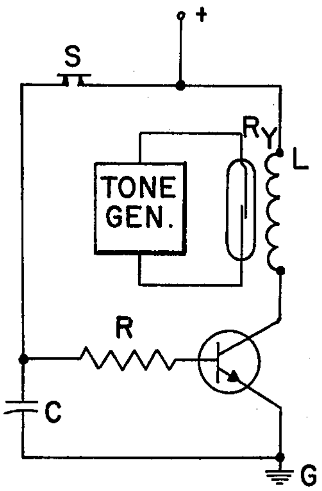

FIGS. 8*d* and 8*e* depict the simple circuits for the activation of the corresponding sounds by the sensors. The tone generator or the "shaper" is connected to the contacts of a relay Ry. The coil L of this relay is connected in series with the sensor S and is connected to a power supply and to the ground G (FIG. 8*d*). The advancing conductive mark on the S sensor activates the relay Ry, and then the tone generator or "shaper." The mechanical inertia of the contact pair of the relay Ry and the impedance of the L-C components filter out noises generated eventually by the conductive marks. Relay Ry can be a Reed-Switch type because of its fast response and small dimensions. The activator coil L can be wound directly around the glass body of the Reed-Switch.

FIG. 8*e* is an improved modification of the same circuit which combines the circuits depicted in FIGS. 8*c* and 8*d*. Economical consideration suggests the application of the circuit 8*e* since the load on the sensor S and the necessary number of the windings on the Reed-Switch is significantly reduced by the use of the transistor connected in series with the coil L.

Generally, the circuit shown in FIG. 8*e* is the most practical in the case where the device, according to the invention, activates an existing electronic organ. The tone actuator lead of the relay Ry is connected to the corresponding terminal of each key regardless of its principal function since this device acts the same way as a performer with the depression of the keys of the manuals.

The variety of other possible circuits is large. The described electronic circuits are only examples of already known and applied solutions to the numerous uses. This invention, however, points to the necessity of the noise suppression related to the correct function of this device.

THE RECORD

Figure 9:
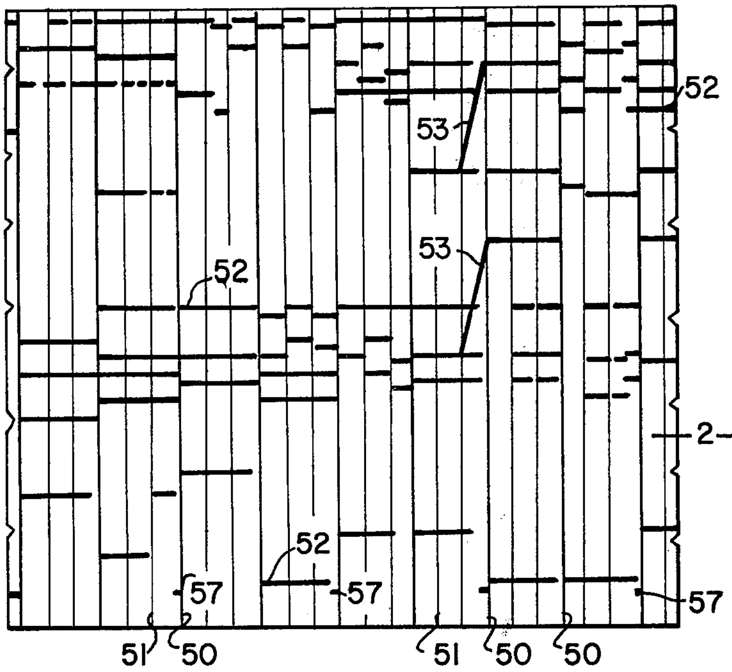
FIG. 9 is a top view of a typical recorded slip.

FIG. 9 illustrates a part of an elastic recorded slip drawn or written by the arranger himself. For simplification, it is called a record. Since the record contains all the tones necessary to the completion of a musical work, its length can measure several meters. Typical advancing speed of the record is 60 to 100 cm. per minute.

Figure 10:
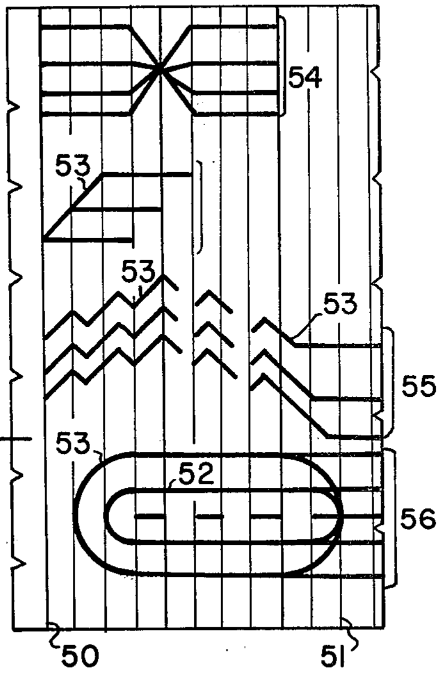
FIG. 10 is a top view of the recorded slip with marks for sound effects.

The record 2 is a sheet of elastic insulating material acceptable for writing or drawing on its surface. The surface of the record is prepared with printed or drawn parallel lines 50 and 51. The lines 50 represent the beginning or end of each measure of the composition in accordance with the manuscript. Each measure is divided with thinner lines 51 as the separation line between the beats or as tempo lines. The preprinted parallel lines 50–51 greatly reduces the work of the composer and renders the exact timing of the arrangement. The conductive marks 52 are drawn with soft graphite pencil or with conductive ink or paint already in existence. The length of each conductive mark 52 corresponds to the time duration of a selected sound, and its vertical position to the spacing of the different pitches or sounds of the twelve-tone musical scale. The exact vertical distribution of the conductive notes in easily produced by the arranger, in accordance with this invention, on the composer board described later. Diagonal and curved marks 53 (FIG. 10) are musical expressions with attractive sound effects not manually playable on any electronic musical instrument of organ. The letter "E", the patterns of diagonal lines 53 and symbols 54, 55, 56, which are also not manually playable on any electronic musical instrument, or on any electronic organ or synthesizer, similarly create lovely sound effects if the timing, size and position are correctly selected.

According to this invention, some of these marks, as well as the dots 57, switch electrical signals to synchronize beats or tempos between this device and an existing electronic rhythm instrument. Other marks control the character of the sounds; for example, from violin to trumpet or vice versa, or both, on/off.

The convenient vertical separation of the conductive marks 52 is proposed to be 1.5 mm. Therefore, the width of record 2 with five octaves of twelve-tone musical scales, including three positions of control marks for electrical instruction is 10 cm. (4 inches). This invention is not specific to the width of the record; the size can be anything practical and economical in accordance with the complexity and quality of a composition.

The great advantage of the device, contrary to any known invention existing in the market or literature, is its capacity for the expression of complex instrumentations. The translation of musical notes to sound-activating marks can be partially or totally erased with ease at any place on the record by the musician himself. As mentioned before, the unsatisfactory section can be cut out and can be replaced by gluing or taping together the corrected or worked-out sections. The recorded slip 2 is immediately playable in its partially recorded or unfinished condition and with any speed or tempo selected by the author himself.

One of the proposed materials for the record 2 can be common tracing paper. Its translucent structure permits the observation of the drawn marks 52 through its back side.

The rehearsal of a finished composition can be recorded with the conventional tape recorder. The device, accordingly, does not necessarily control the intensity, the tone character, the pattern of the different tones or the applied rhythm instrument since the musician has plenty of time to switch different sound effects and patterns himself. However, compositions with complex variations in instrumentation or rhythm patterns poses some difficulties in the manual coordination of the musician. Therefore, instructions or symbols are written on the back side of record 2.

Dotted lines drawn by the musician at the beginning or the end of the movements, parts, sections, are recognizable through the translucent record. Written instructions or symbols prepares the listener for the manipulation of the tabs or knobs of the electronic musical instrument.

THE COMPOSER BOARD

Figure 11:
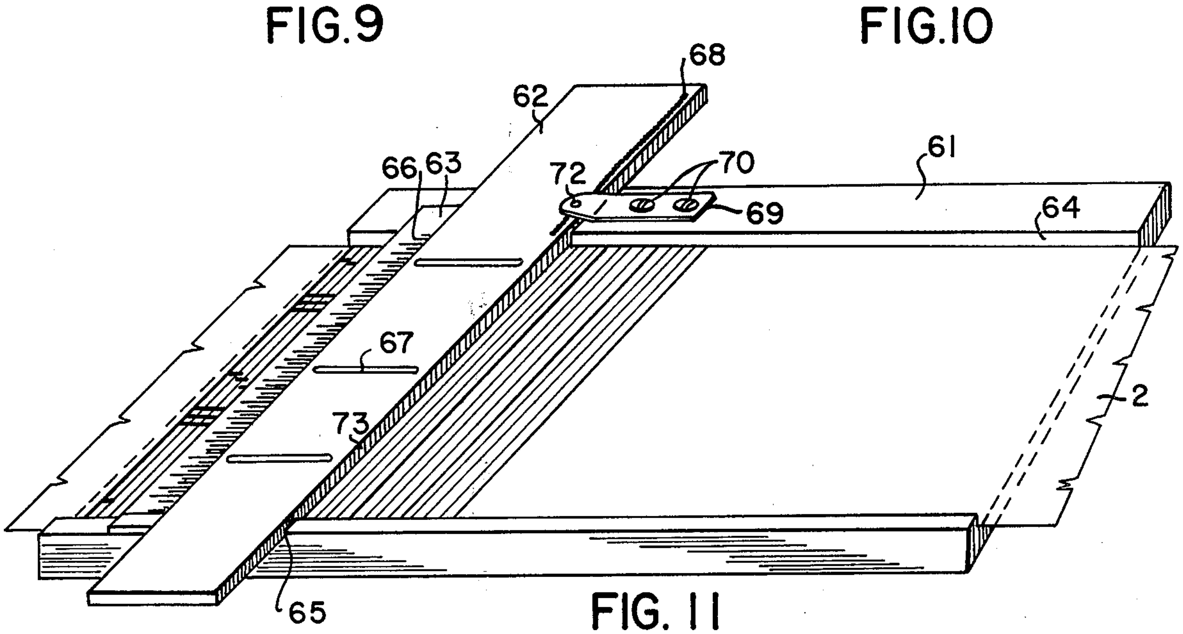
FIG. 11 is a perspective view of the composers drawing board.

In accordance with this invention, the composer or the arranger transforms the musical composition from the manuscript or from the notebook to an elastic slip 2 on the composer board (FIG. 11). The composer board consists of a platform 61, a movable stencil 62, a reference scale 63 and an arrester spring 69. In the platform 61 is a shallow channel 64 formed for the acceptance of the elastic slip 2 or record. This channel 64 is slightly wider than the slip 2 to permit free repositioning along its length by the arranger. Another channel 65 in the platform 61, oriented perpendicular to channel 64, guides the stencil 62 in its movement above the elastic slip 2 which is inserted in channel 64. The reference scale 63 is cemented or solidly attached to the platform 61 close to the movable stencil 62 and over the slip 2. Engraved marks 66 on the reference scale 63 represent the position of all the musical notes with a plurality of twelve-tone scales in accordance with the complexity of the electronic musical instruments. The distribution of the marks 66 is in accordance with the distribution of the conductive lines 30 on the P.C. board 17 (FIG. 7).

Proposed color coding of the engraved marks 66 facilitates the recognition of the positions of the different modes or manuals. For example, white for two octaves of solo, yellow for two octaves of accompaniment, red for one octave of pedal, black for synchronization, etc.

The movable stencil 62, made from thin transparent material (plastic) having slots 67 and holes 68 guides the marker (pencil, pen, etc.) to the exact position of the musical tones selected by the composer or arranger. The width of the slots 67 corresponds to the diameter of a pencil lead or marker. The conductive marks 52 (FIG. 9) are drawn through these slots 67. The number of the slots 67 are equal with the number of the engraved modes of the reference scale 63, and each slot 67 points to the same notes of the corresponding octaves. This arrangement of the slots 67 accelerates the graphical arrangement of the conductive marks 52 onto the slip 2 to be recorded. The same slot 67 is used for the marks of the synchronization or for the selection of sound effects.

Figure 12:
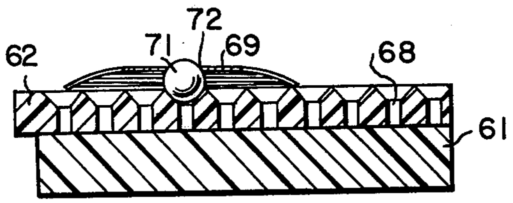
FIG. 12 is an enlarged cross-sectional view of the arrester on the drawing board.

For the task of exact positioning, the holes 68 formed in the stencil 62 are arranged in a line parallel to the stencil's movement. The distances between the holes 68 and its quantity are the same as those of the engraved marks 66 of the reference scale 63. The arrester spring 69, fastened with screws 70 to the platform 61, presses the stencil 62 down in its channel 65. The enlarged cross-sectional drawing (FIG. 12) along the centers of the holes 68 illustrates the shape of the holes 68, the arrester spring 69 and a small steel ball 71. The rounded end of the arrester spring 69 is furnished with a hole 72 for blocking the steel ball 71 against any horizontal displacement of the stencil 62. The vertical force of the arrester spring 69 pushes down the steel ball 71 into the center of the hole 68 which corresponds to the selected engraved mark 66 of the reference scale 63, which therefore aligns it in its correct position. A necessary horizontal displacement of the reference scale 62 forces the steel ball 71 out from the funnel of hole 68 against the arrester spring 69 which bends upward and gives free way for new repositions.

The drawing of the conductive marks through the guiding slots 67 onto the slip 2 is effortless with this composer board. The preprinted lines of the slip 2 and the holes on the stencil 62 are provided for the correct positions of the musical notes expressed with the length of the conductive marks.

Instead of the preprinted slip 2, the musician himself can draw the perpendicular lines 50 and 51, along the edge 73 of the stencil 62, on paper cut to the correct size, with the help of engraved reference lines on the platform 61 or stencil 62 (not shown on the drawings).

The features and principles of the described invention suggest to those skilled in the art many other modifications thereof. Accordingly, it is desired that the appended claim shall not be limited to any specific feature or details thereof.

What is claimed is:

1. Apparatus for reading markings on a moving elongated flexible strip comprising:

an insulating member having a substantially flat surface;

a plurality of thin elongated conductive members permanently affixed to and arranged in closely spaced parallel fashion upon the flat surface of said member;

each of said conductive members being separated into associated first and second conductor portions having spaced apart adjacent ends defining a gap exposing the surface of said member;

said strip being slidable in a predetermined direction along said flat surface of said insulating member with the surface of said strip bearing said markings engaging said flat surface of said insulating member;

said elongated conductive members being in alignment with the direction of movement of said strip;

resilient means positioned to urge said strip into ultimate engagement with said gap region and the ends of the conductor portions in the immediate region of said gap region;

said markings being formed with an electrically conductive material; and means for coupling electrical power to said first conductor portions, whereby electrical power is conducted to said second conductor portions when a marking on said strip bridges the gap between associated first and second conductor portions.

2. The apparatus of claim 1 wherein said insulation means comprises a printed circuit board and said conducting members are comprised of printed circuit conductors arranged upon the flat surface of said board.

3. The apparatus of claim 2 wherein the ends of the associated printed circuit conductors adjacent said gap and the gap between said ends collectively form a concave surface.

4. The apparatus of claim 3 wherein said resilient means comprises a cylindrical shaped member having a resilient compressible periphery urged against said strip.

5. The apparatus of claim 4 wherein the curvature of said concave surface substantially conforms to the surface curvature of said cylindrical shaped member.

6. The apparatus of claim 4 wherein said resilient means comprises a rotatable cylindrical shaped member having a resilient compressible periphery urged against said strip to assure intimate contact between the engaged surfaces of said strip and said conductor portions.

7. The apparatus of claim 6 further comprising means for rotating said cylindrical shaped member for feeding said strip along said insulating member.

8. The apparatus of claim 6 further comprising means for feeding said strip along said insulating member.

9. The apparatus of claim 6 further comprising operating means movable being a first position for moving said cylindrical shaped member away from said printed circuit board and a second position for moving said cylindrical shaped member.

10. The apparatus of claim 2 wherein the ends of the associated printed circuit conductor portions are curved downwardly toward the gap between said ends formed by the printed circuit board, whereby said ends are flush with the surface of the printed circuit board.

11. The apparatus of claim 1 further comprising a plurality of tone generator means each coupled to one of said second conductor portions said tone generator means each being adapted generate different tones.

12. The apparatus of claim 11 further comprising transistor means coupling each second conductor portion to its associated tone generator to apply a signal of increased signal strength to said tone generator.

13. The apparatus of claim 12 further comprising means including a capacitor coupled with each transistor means for sustaining even a brief contact bridging condition for a period sufficient to activate the associated tone generator.

14. The apparatus of claim 1 further comprising an electronic musical instrument having a plurality of tone generator means each coupled to one of said second conductor portions, said tone generator means each being adapted generate different tones.

15. Apparatus for composing a pattern of parallel lines controlled upon an elongated strip having at least one straight longitudinal edge, comprising:

a composing board having a main recess for receiving and supporting said strip, said recess having one upright side for locating and aligning the said one longitudinal edge of said strip;

an elongated slidable rule extending across said recess;

a pair of transverse recesses arranged on said board and located on opposite sides of the strip moving along said main recess for aligning and slidably receiving said rule, the depths of said grooves extending substantially to the surface of the main recess so that the underside of said slidable rule engages the strip positioned upon said recess and is aligned perpendicular to said one upright side;

said rule having a narrow elongated slot extending substantially parallel to said one upright side;

detent means for releasably securing said slidable rule at a plurality of equispaced discrete positions to enable said elongated slot to be moved to a plurality of equispaced discrete positions to facilitate the drawing of straight line upon said strip only said equispaced discrete positions by insertion of the tip of a marking instrument into said slot.

16. The apparatus of claim 15 wherein the width of said slot permits the insertion of only a narrow marking tip to assure the formation of a thin line on said strip.

17. The apparatus of claim 15 further comprising a graduated rule extending across said main recess and mounted upon and secured to said board, said graduated rule having one longitudinal edge aligned adjacent to one longitudinal edge of said slidable rule, said graduated rule having a plurality of graduations in the form of spaced parallel lines, each at least equal in number to the number of said discrete positions which said elongated slot may occupy and being in alignment with each discrete position; said graduations extending to said one longitudinal edge of said graduated rule, said elongated slot being parallel to said graduations.

18. The apparatus of claim 15 wherein a plurality of spaced parallel slots are provided in said slidable rule; said slots being spaced from one another by a distance equal to an integral multiple of the distance between adjacent discrete positions capable of being occupied by said elongated slot.

19. The apparatus of claim 15 wherein said detent means comprises a resilient member having a mounting portion secured to said board and having a free end portion positioned to be urged toward the surface of said slidable rule;

said slidable rule having a plurality of spaced grooves along one surface;

said free end portion having engaging means releasably engaging said grooves for releasably maintaining said slidable rule in each of said discrete positions.

20. The apparatus of claim 19 wherein said engaging means comprises a rigid spherical member; said free end portion having an opening of a diameter smaller than the diameter of said spherical member, enabling said spherical member to extend partially through said open end and being based to urge said spherical member towards said slidable rule to urge said spherical member into releasable engagement with said spaced grooves whereby said slidable rule occupies one of said discrete positions when said spherical member is positioned in one of said grooves.

21. Apparatus for creating and thereafter reading markings on a movable elongated flexible strip having at least one straight longitudinal side, comprising:

composing means for creating a pattern of parallel lines of a controlled length and thickness upon an elongated strip comprising;

a board having a main recess for receiving and supporting said strip, said main recess having one upright side for locating and aligning the one longitudinal edge of said strip;

an elongated slidable rule extending across said first recess;

a pair of transverse slots on said board arranged on opposite sides of said recess for locating and slidably receiving said slidable rule, the bottom surfaces of said grooves extending substantially to the surface of said recess so that the underside of said rule engages the strip positioned upon said recess;

said slidable rule having a narrow elongated slot extending substantially parallel to said upright side;

said slidable rule being movable to a plurality of equispaced discrete positions to enable said elongated slot to be moved to each discrete position to facilitate the drawing of straight line upon said strip only said discrete positions;

reading means being positioned adjacent to said composing means to receive said strip from said composing means, said reading means including:

a substantially flat insulating member;

a plurality of elongated conductive members arranged in a closely spaced parallel fashion at equispaced intervals upon one surface of said member said intervals being equal to the spacing between the discrete positions determined by said composing board;

each of said conductive members being separated into associated first and second conductor portions, whereby the ends of adjacent first and second conductor portions define a gap exposing the surface of said member;

said strip being slidable along said one surface with the surface of said strip bearing said markings engaging said one surface of said member;

said elongated members being in alignment with the direction of movement of said strip;

resilient means positioned to urge said strip into ultimate contact with said gap region and the conducting members in the immediate region of said gaps;

said markings being formed with an electrically conductive material; and means for coupling electrical power to said first conductor portions, whereby the electrical power is conducted to selected ones of said second conductor portions when a marking on said strip bridges the gap between associated first and second conductor portions.

* * * * *